(12) United States Patent
Spindler et al.

(10) Patent No.: US 8,752,877 B2
(45) Date of Patent: Jun. 17, 2014

(54) METHOD AND APPARATUS FOR INSTALLING DECORATIVE LIGHTS

(76) Inventors: Daniel Spindler, Newhall, CA (US); Joan Marie Schlesinger, Canyon Country, CA (US)

( * ) Notice: Subject to any disclaimer, the term of this patent is extended or adjusted under 35 U.S.C. 154(b) by 221 days.

(21) Appl. No.: 13/211,544

(22) Filed: Aug. 17, 2011

(65) Prior Publication Data

US 2013/0042958 A1 Feb. 21, 2013

(51) Int. Cl.
*B25J 1/04* (2006.01)
(52) U.S. Cl.
USPC .............................. 294/209; 294/24
(58) Field of Classification Search
USPC ........ 294/209, 2, 24, 210, 211; 248/339, 544; 403/53, 91, 97
See application file for complete search history.

(56) References Cited

U.S. PATENT DOCUMENTS

| | | | |
|---|---|---|---|
| 4,395,840 A * | 8/1983 | Banks, Jr. | 43/17.2 |
| 4,469,361 A * | 9/1984 | Pendergraft | 294/175 |
| 5,308,253 A * | 5/1994 | Maki | 439/148 |
| D348,186 S * | 6/1994 | Wahl | D8/14 |
| 5,560,975 A | 10/1996 | Casper | |
| 5,575,470 A * | 11/1996 | Sherman | 473/489 |
| 5,713,617 A | 2/1998 | Marinaro | |
| 5,964,489 A * | 10/1999 | Mahoney | 294/24 |
| 6,352,291 B1 * | 3/2002 | Tortajada | 294/24 |
| 6,425,614 B1 * | 7/2002 | Limber et al. | 294/24 |
| 6,473,953 B1 | 11/2002 | Portnoff | |
| 6,652,013 B1 | 11/2003 | Peterson | |
| 7,669,827 B2 | 3/2010 | Urrutia | |
| 8,075,031 B2 * | 12/2011 | Walker, Jr. | 294/24 |
| 2008/0061571 A1 | 3/2008 | Schopp | |

* cited by examiner

*Primary Examiner* — Paul T Chin

(57) ABSTRACT

A tool for installing decorative lights may include a hook-placement head configured for attachment to a pole, and a string-placement head configured for attachment to the pole. The tool may be employed to decorate a structure with a string of decorative lights by placing an adhesive-backed hook onto a pole-mounted hook-placement head, raising the hook-placement head to position the hook at a desired location on the structure, placing a portion of the string onto a pole-mounted string-placement head; and raising the string-placement head to the positioned hook to engage the string with the hook.

10 Claims, 3 Drawing Sheets

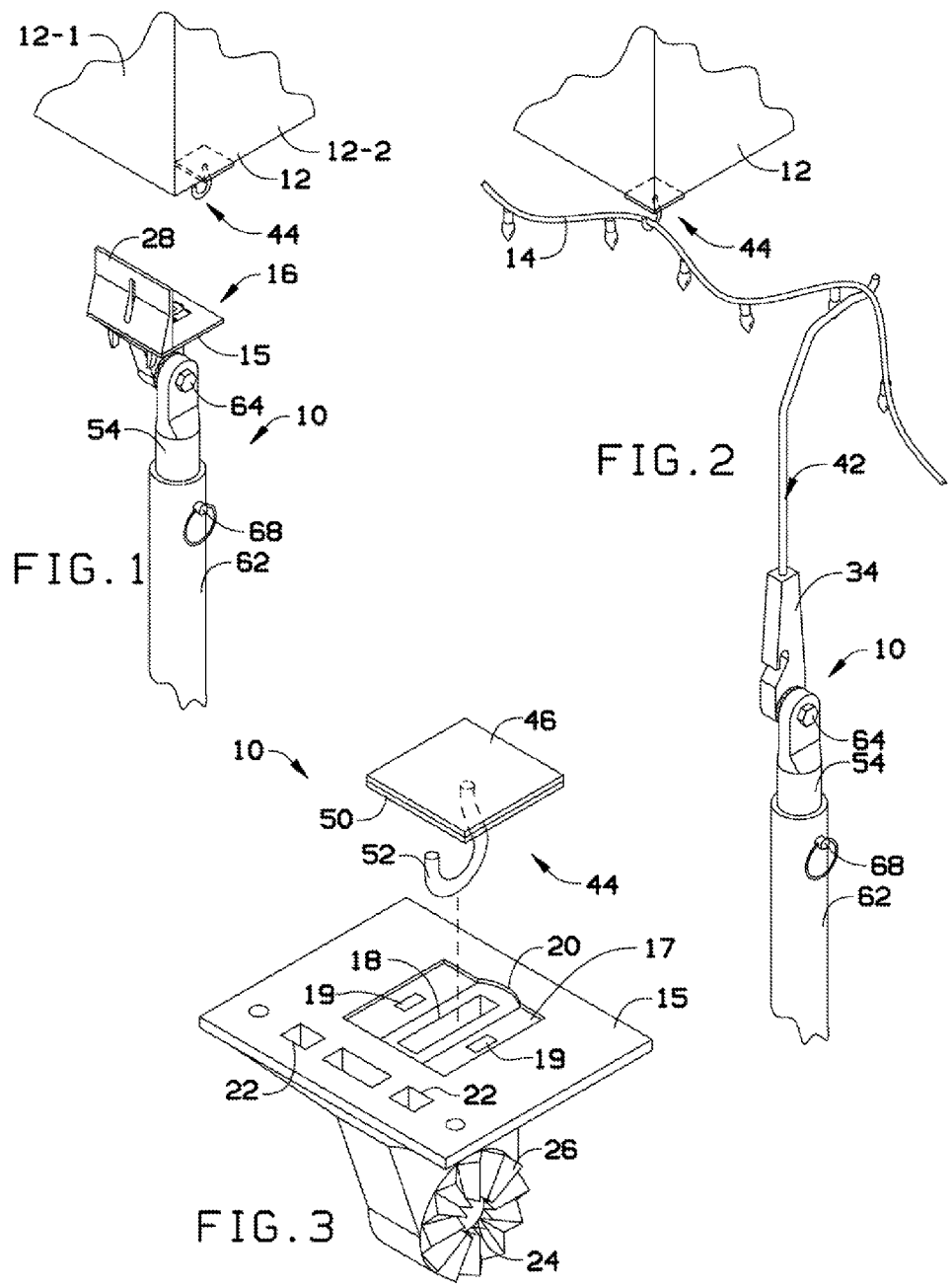

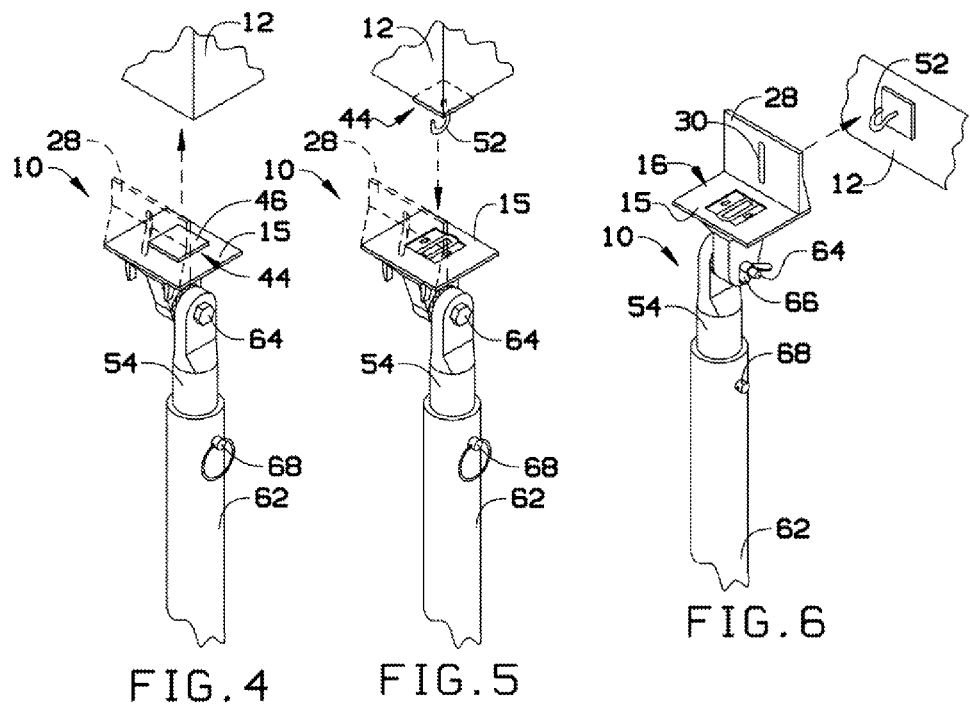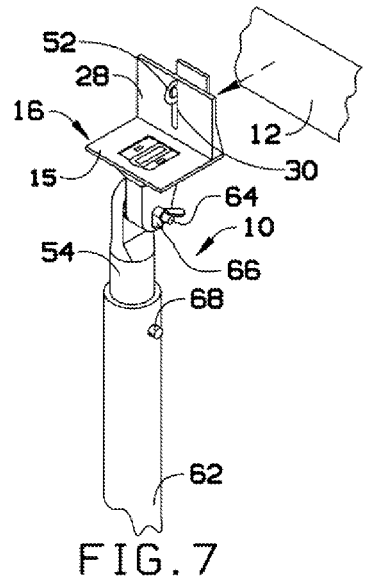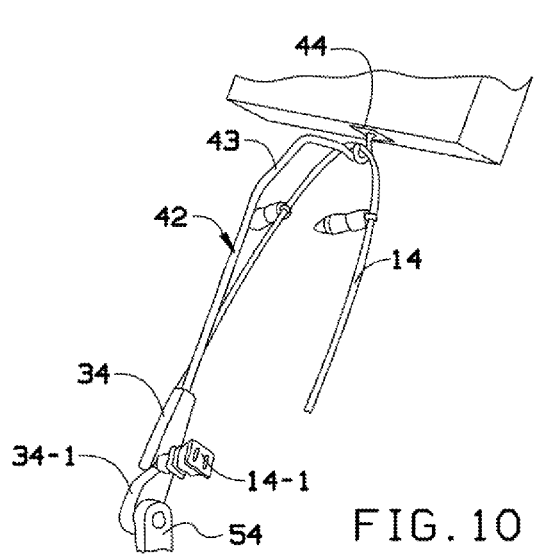

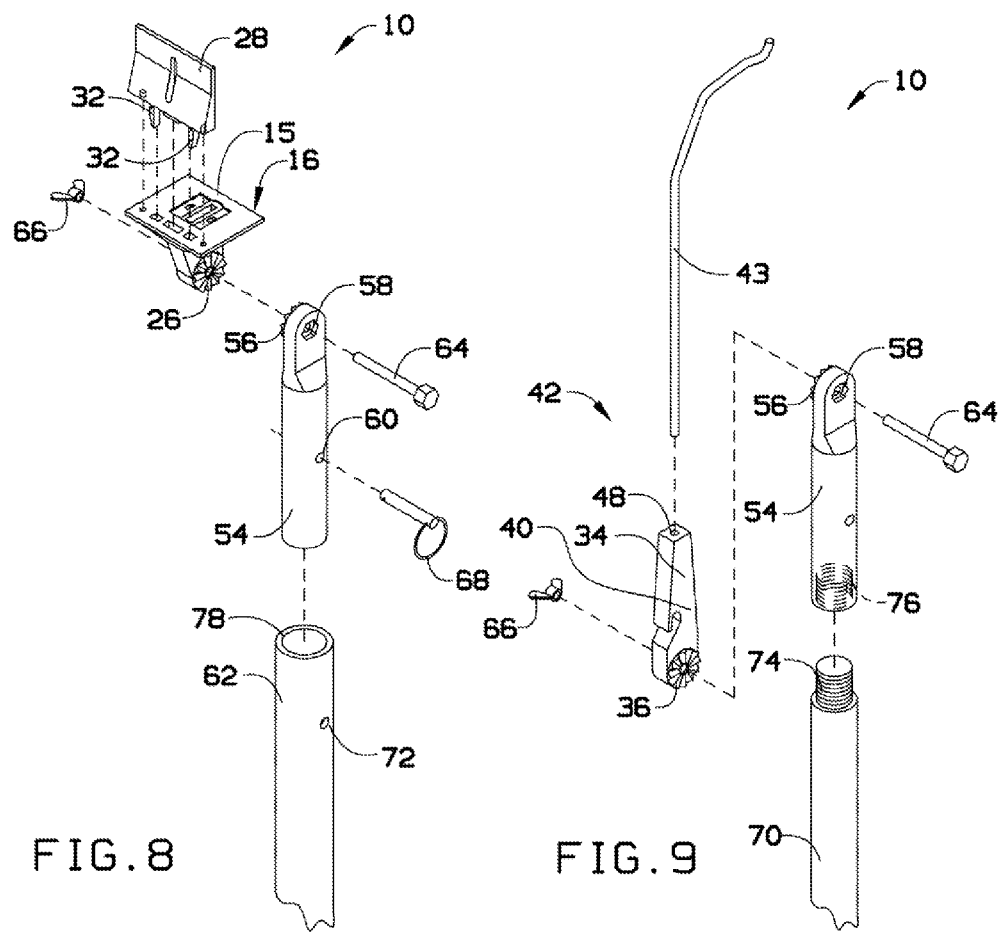
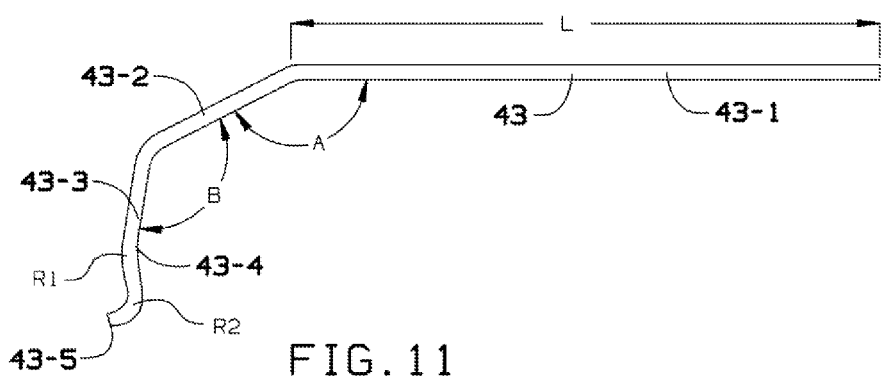

METHOD AND APPARATUS FOR INSTALLING DECORATIVE LIGHTS

RELATED APPLICATIONS

This application claims the benefit of U.S. Provisional Patent Application No. 614,790,076 filed on Apr. 26, 2011.

BACKGROUND OF THE INVENTION

The present invention generally relates to installation of decorative lights on buildings and other elevated locations.

During holiday seasons and during other festive events, decorative lights may be installed on buildings and other structures. Typically such lights are constructed as strings of small light fixtures held together by common wiring.

Installation and subsequent removal of such lights is typically performed by people working on ladders or motorized lift equipment. In many instances, more than one person may be required to position on an elevated portion of a structure or remove the lights from the structure.

As can be seen, there is a need for a system of installing and removing decorative lights in which one person may perform the task without use of ladders or other lift equipment.

SUMMARY OF THE INVENTION

In one aspect of the present invention, a tool for installing a string of decorative lights may comprise: a hook-placement head configured for attachment to a pole; and a string-placement head configured for attachment to the pole.

In another aspect of the present invention, a kit for installing a string of decorative lights may comprise: a plurality of adhesive-backed hooks; a hook-placement head configured for attachment to a pole; and a string-placement head configured for attachment to the pole.

In still another aspect of the invention, a method for decorating a structure with a string of decorative lights may comprise the steps of: placing an adhesive-backed hook onto a pole-mounted hook-placement head; raising the hook-placement head to position the hook at a desired location on the structure; placing a portion of the string onto a pole-mounted string-placement head; and raising the string-placement head to the positioned hook to engage the string with the hook.

These and other features, aspects and advantages of the present invention will become better understood with reference to the following drawings, description and claims.

BRIEF DESCRIPTION OF THE DRAWINGS

FIGS. 1 and 2 are perspective views of a tool for installing a string of lights in accordance with an embodiment of the invention;

FIG. 3 is a detailed view of a portion of the tool of FIG. 1;

FIGS. 4-7 are perspective views of operational aspects of the tool of FIG. 1 in accordance with an embodiment of the invention;

FIG. 8 is an exploded view of the tool of FIG. 1;

FIG. 9 is an exploded view of the tool of FIG. 2;

FIG. 10 is a perspective view of operational aspects of the tool of FIG. 2; and

FIG. 11 is a detailed view of a portion of the tool of FIG. 2.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a hand-held pole with adapters that are configured to place mounting hooks at desired location and place light strings onto the mounting hooks.

Referring to the Figures, it may be seen that a two-component placement tool 10 may comprise a hook-placement head 16 and a string-placement head 42. In a hook-placement configuration, hook-placement head 16 may be attached to a pole 62 as shown in FIG. 1. In a string-placement configuration, the string-placement head 42 may be attached to the pole 62 as shown in FIG. 2. The hook-placement head 16 may comprise a base 16 and a guide member 28. The string-placement head 42 may comprise a base 34 and a wand 43. The tool 10 may be employed as part of an installation kit that may include a plurality of string-supporting hooks 44.

In operation, the tool 10 may be employed to perform various functions that relate to placement and removal of strings 14 of lights. First, a plurality of the string-supporting hooks 44 may be attached to a structure 12. Second, the string 14 may be placed into the hooks 44. Third, the tool 10 may be employed to remove the string 14 from the hooks 44 and, optionally, the tool 10 may be employed to remove the hooks 44 from the structure 12.

In an exemplary embodiment of a method for placing and removing the strings 14, the hooks 44 may be constructed with an adhesive-backed base 50 and a support member 52. The base 15 of the head 16 may be provided with a pocket 17 and a slot 18 configured to accept the hook 44. One of the hooks 44 may be placed in the pocket 17 and a peel-away cover may be removed to expose an adhesive backing 46. Magnets 19 may hold the hook 44 within the pocket 17. The head 16 may then be raised to position the hook 44 at a desired location. Pressure may be applied to the hook 44 so that the adhesive backing may adhere to the structure 12. The head 16 may then be pulled away from the structure 12 so that the hook 44 is released from the magnets 19.

In placing one of the hooks 44 on a horizontal surface 12-2 such as a building soffit, it may be desirable to utilize the guide member 28. The guide member 28 may be positioned against a vertical surface 12-1 of the soffit and the hook 44 may thus be positioned a predetermined distance from the vertical 12-1 surface as shown in FIG. 1. In placing the hook 44 on a vertical surface, the guide member 28 may be removed from the head 16 and the base 15 of the head 16 may be oriented parallel to the vertical surface.

Angular orientation of the head 16 relative to an axis of the pole may be varied through use of an adjustment system that comprises a multi-faceted disk 26 mounted on the head 16 and a corresponding multi-faceted disc 56 mounted on an end-piece 54. A bolt 64 passing through a hole 58 and a wing-nut 66 may hold the discs 26 and 56 together after a desired angular orientation is established. Similarly, angular orientation of the string-placement head 42 may be varied through interaction between the disc 56 and a multi-faceted disc on the base 34 of the head 42.

The guide member 28 may be detachably mounted on the head 16 with tabs 32 that may be inserted into slots 22 formed in the base 15. The tabs 32 may project out of the base 15 when the guide 28 is installed on the head 16. The guide 28 may be readily removed from the head 16 by pressing the tabs 32 together to release the tabs 32 from the slots 22.

After a desired number of the hooks 44 are in place, the head 16 may be removed from the pole 62 and replaced with the string-placement head 42. By referring particularly to FIG. 10, it may be seen that a connection plug 14-1 of the string 14 may be placed in a holding notch 34-1 of a base 34. The string 14 may be looped over the wand 43 of the head 42. The weight of the string 14 may produce tension in a portion of the string 14 between the wand 43 and the plug 14-1 held in the notch 34-1.

The wand 43 and an engaged portion of the string 14 may then be lifted to one of the hooks 44. The wand 43 may be positioned adjacent the hook 44 so that the string 14 engages with the hook 44. After the string 14 is engaged with the hook 44, the wand 43 may be lowered. Lowering the wand 43 from the engaged string may release tension on the plug 14-1 and the plug 14-1 may be released from the notch 34-1.

The lowered wand 43 may then be engaged with a successive portion of the string 14 and that portion may be lifted into engagement with a successive one of the hooks 44. This process may be repeated until the entire string 14 is supported on the hooks 44.

Removal of the string 14 from the hooks 44 may be performed by reversing this process. The wand 43 may be raised to engage with the string 14 and portions of the string 14 may be successively lifted from the hooks 44 and lowered to the ground.

An advantageous configuration for the wand 43 may be illustrated in FIG. 11. The wand may have a stem 43-1 with a length L of about 7 inches to about 8 inches. The stem may be connected to a first transition piece 43-2 at an angle A of about 150° to about 160°. The first transition piece may be connected to a second transition piece 43-3 at an angle B of about 120° to about 130°. A hook 43-4 may be attached to a second transition piece at a curved connection 43-5 having a radius R1 of about 1 inch to about 1.5 inch. The hook 43-4 may be formed with a radius R2 of about 0.3 inch to about 0.5 inch.

In operation, a person may orient an angular position of the string-placement head 42 so that the first transition piece 43-2 is horizontal i.e., parallel to the ground. In that position, a portion of the string 14 may be supported on the first transition piece 43-2 as the string is lifted. With a simple hand-motion angle shift of the pole 62 or 70, the orientation of first transition piece 43-2 may be changed so that the lifted portion of the string may slide into the hook 43-5 of the wand 43. Thus the first transition piece 43-2 may be particularly useful when placing the string 14 onto the hooks 44.

Similarly, a person may orient an angular position of the string-placement head 42 so that the second transition piece 43-3 is horizontal i.e., parallel to the ground. In that position, a portion of the string 14 may be supported on the second transition piece 43-3 as the string is lifted. With a simple hand-motion angle shift of the pole 62 or 70, the orientation of second transition piece 43-3 may be changed so that the lifted portion of the string may slide onto the first transition piece 43-2. Thus the second transition piece 43-3 may be particularly useful when removing the string 14 from the hooks 44.

It may be noted that the guide member 28 may be provided with a hook-removal slot 30. The member 28 may be employed to remove the hooks 44 from the structure 12 by placing the slot 30 over the support member 52 of the hook 44 and pulling the hook 44 away from the structure as illustrated in FIGS. 6 and 7.

The tool 10 may be used in conjunction with various types of poles. For example, the pole 62 may be an extendable telescoping pole or a fixed-length pole with a pin connection 68 for attaching the end piece 54. In that regard the pin 68 may pass through holes 60 and 72. Alternatively, a pole 70 may have a threaded connection to the end piece 54 using internal threads 76 and external threads 74.

It should be understood, of course, that the foregoing relates to exemplary embodiments of the invention and that modifications may be made without departing from the spirit and scope of the invention as set forth in the following claims.

What is claimed is:

1. A tool for installing a string of decorative lights comprising:
    a pole;
    an end-piece removably attached to the pole via a pin connection or a threaded connection;
    a hook-placement head configured for removable attachment to the pole via the end-piece, wherein the hook-placement comprises a base with a pocket and a slot configured for retention of a hook within the pocket; and
    a string-placement head configured for removable attachment to the pole via the end-piece, wherein the string-placement head is configured to lift the string of decorative lights to be supported on a plurality of the hooks.

2. The tool of claim 1 wherein angular orientation of the hook-placement head is adjustable relative to an axis of the pole.

3. The tool of claim 1 wherein angular orientation of the string-placement head is adjustable relative to an axis of the pole.

4. The tool of claim 1 wherein the pocket is provided with magnets positioned for retention of the hook within the pocket.

5. The tool of claim 1 wherein the hook-placement head comprises a removable guide member.

6. The tool of claim 5 wherein the removable guide member comprises a hook-removal slot.

7. The tool of claim 1 wherein the string-placement head comprises a wand with a hook at one of its ends.

8. The tool of claim 7 wherein the wand comprises:
    a stem with a length of about 7 inches to about 8 inches;
    a first transition piece connected to the stem at an angle of about 150° to about 160°;
    a second transition piece connected to the first transition piece an angle of about 120° to about 130°;
    a curved connection having a radius of about 1 inch to about 1.5 inch interposed between the second transition piece and the hook.

9. The tool of claim 1 wherein the string-placement head comprises a base having a notch therein configured for retention of a plug of the string.

10. A kit for installing a string of decorative lights comprising:
    a plurality of adhesive-backed hooks;
    a hook-placement head configured for removable attachment to a pole wherein the hook-placement comprises a base with a pocket and a slot configured for retention of one of the adhesive-backed hooks within the pocket; and
    a string-placement head configured for removable attachment to the pole, wherein the string-placement head is configured to lift the string of decorative lights to be supported on the adhesive-backed hooks.

* * * * *